United States Patent
Cho (10) Patent No.: US 12,327,889 B2
(45) Date of Patent: Jun. 10, 2025

(54) FUEL CELL VEHICLE

(71) Applicants: Hyundai Motor Company, Seoul (KR); Kia Corporation, Seoul (KR)

(72) Inventor: Min Uk Cho, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 463 days.

(21) Appl. No.: 17/936,291

(22) Filed: Sep. 28, 2022

(65) Prior Publication Data

US 2023/0145296 A1    May 11, 2023

(30) Foreign Application Priority Data

Nov. 5, 2021   (KR) .................. 10-2021-0151448

(51) Int. Cl.

| | |
|---|---|
| H01M 8/0267 | (2016.01) |
| B60L 50/72 | (2019.01) |
| H01M 8/04746 | (2016.01) |
| H01M 8/04858 | (2016.01) |
| H02G 3/08 | (2006.01) |

(52) U.S. Cl.
CPC ........... *H01M 8/0267* (2013.01); *B60L 50/72* (2019.02); *H01M 8/04768* (2013.01); *H01M 8/04925* (2013.01); *H02G 3/08* (2013.01); *H01M 2250/20* (2013.01)

(58) Field of Classification Search
CPC ....... B60L 2240/36; B60L 50/70; Y02E 50/60
See application file for complete search history.

(56) References Cited

U.S. PATENT DOCUMENTS

| | | | |
|---|---|---|---|
| 11,417,897 B2 | 8/2022 | Lee et al. | |
| 11,444,353 B2 | 9/2022 | Yamamoto et al. | |
| 2018/0034021 A1* | 2/2018 | Yamamoto | H01M 10/6566 |
| 2019/0393133 A1* | 12/2019 | Asai | H05K 7/20927 |
| 2021/0155224 A1* | 5/2021 | McKibben | B60L 50/75 |

FOREIGN PATENT DOCUMENTS

| | | | |
|---|---|---|---|
| JP | 2007335126 A | * | 12/2007 |
| JP | 2019103247 A | | 6/2019 |
| JP | 6540628 B2 | | 7/2019 |
| KR | 1020220036134 A | | 3/2022 |

OTHER PUBLICATIONS

Naito et al., JP 2007335126 A, Espacenet machine translation, 2007 (Year: 2007).*

* cited by examiner

*Primary Examiner* — Adam A Arciero
(74) *Attorney, Agent, or Firm* — Slater Matsil, LLP (57) ABSTRACT

In an embodiment a system includes a fuel cell, a bus bar having one end portion configured to be electrically connected to the fuel cell, the bus bar being electrically conductive, a terminal block configured to be electrically connected to an opposite end portion of the bus bar, a junction box including a chamber storing a coolant and a tube forming a path to allow the coolant to flow from the chamber to a cover of the terminal block and an insulation protection unit disposed to surround at least a portion of the bus bar to electrically insulate the bus bar from the fuel cell, the insulation protection unit having a flow path to allow the coolant supplied from the cover to flow therethrough.

17 Claims, 11 Drawing Sheets

FUEL CELL VEHICLE

CROSS-REFERENCE TO RELATED APPLICATIONS

This application claims the benefit of Korean Patent Application No. 10-2021-0151448, filed on Nov. 5, 2021, which application is hereby incorporated herein by reference.

TECHNICAL FIELD

Embodiments relate to a fuel cell vehicle.

BACKGROUND

A fuel cell included in a fuel cell vehicle is a power generation device in which hundreds of stacked unit cells generate electricity. The generated electricity is collected in current collectors disposed at respective end portions of a cell stack, and is transferred to a junction box disposed at the upper end of the cell stack. To this end, the fuel cell vehicle includes a bus bar and a terminal block in order to transfer the electricity collected in the current collectors to the junction box.

The bus bar is a conductor that serves as an electrical path connecting the current collectors to the terminal block, and the terminal block is a component for transferring the electricity received from the current collectors through the bus bar to the junction box.

When the high voltage generated in the fuel cell is transmitted through the bus bar at a high current density, the bus bar generates heat. A method of increasing the cross-sectional area of the bus bar in order to respond to the amount of heat generated in the bus bar may be proposed. In this case, however, when the distance between coolant and an end of the bus bar is long, the heat caused by the resistance of the bus bar, which is a conductor, is not uniformly distributed, which entails a problem in which the cross-sectional area of the bus bar needs to be designed in consideration of the point in the bus bar at which the temperature of the bus bar due to the heat generated therein is the highest.

Further, the increase in the cross-sectional area of the bus bar may increase the size, manufacturing cost, and weight of the bus bar, and may be disadvantageous from the aspect of packaging. Accordingly, there are limitations on the extent to which the output of a fuel cell vehicle equipped with a fuel cell can be increased and the extent to which the size thereof can be reduced.

SUMMARY

Embodiments provide a system or a fuel cell vehicle. Various embodiments provide a system or a fuel cell vehicle that substantially obviates one or more problems due to limitations and disadvantages of the related art.

Embodiments provide a fuel cell vehicle including a bus bar having a small cross-sectional area.

A fuel cell vehicle according to an embodiment may include a fuel cell, a bus bar, which has one end portion electrically connected to the fuel cell and which is electrically conductive, a terminal block electrically connected to the opposite end portion of the bus bar, a junction box including a chamber storing therein coolant and a tube forming a path to allow the coolant to flow therethrough from the chamber to a cover of the terminal block, and an insulation protection unit, which is disposed so as to surround at least a portion of the bus bar to electrically insulate the bus bar from the fuel cell and which has a flow path to allow the coolant supplied from the cover to flow therethrough.

For example, the insulation protection unit may expose the one end portion and the opposite end portion of the bus bar, and may surround at least a portion of the upper portion, the lower portion, or the side portion of the bus bar.

For example, the cover of the terminal block may include a coolant connection portion connected to the tube to receive the coolant introduced thereinto, a through-hole connected to the coolant connection portion and penetrating the cover, and an adapter connecting the through-hole to the flow path in the insulation protection unit.

For example, the coolant connection portion may have the shape of a nipple that protrudes toward the tube to be coupled to the tube.

For example, the coolant connection portion may have the shape of an opening that is coupled to the tube.

For example, the insulation protection unit may include one end portion, which is disposed at the starting point of the flow path and is an inlet coupled to an end portion of the adapter to receive the coolant introduced thereinto.

For example, the insulation protection unit may include an opposite end portion located opposite the one end portion. The ending point of the flow path may be spaced a predetermined distance apart from the opposite end portion of the insulation protection unit, and the flow path may be blocked at the ending point.

For example, one of the one end portion of the insulation protection unit and the end portion of the adapter may have a protrusion, and the other one of the one end portion of the insulation protection unit and the end portion of the adapter may have a recessed portion formed therein to allow the protrusion to be fitted thereinto.

For example, the fuel cell vehicle may further include a sealing gasket sealing the coupled portion between the protrusion and the recessed portion.

For example, the one end portion of the insulation protection unit and the end portion of the adapter may be integrated.

For example, the insulation protection unit may include a first plate, which is disposed so as to expose the one end portion and the opposite end portion of the bus bar and to surround a portion of each of the lower portion and the side portion of the bus bar, and a second plate, which is coupled to the first plate so as to cover at least a portion of the upper portion of the bus bar and which has formed therein the flow path.

For example, the bus bar may include a first portion vertically overlapping the cover and a second portion extending from the first portion toward an end portion of the fuel cell.

For example, the flow path in the second plate may cover the upper portion of the first portion.

For example, the flow path in the second plate may cover the upper portion of at least a portion of the second portion.

For example, the bus bar may include a first bus bar disposed between one of the two opposite end portions of the fuel cell and the terminal block and a second bus bar disposed between the other one of the two opposite end portions of the fuel cell and the terminal block. The insulation protection unit may include a first insulation protection unit, which surrounds at least a portion of the first bus bar and has a first flow path to allow the coolant to flow therethrough, and a second insulation protection unit, which surrounds at least a portion of the second bus bar and has a second flow path to allow the coolant to flow therethrough.

For example, the first bus bar and the second bus bar may have cross-sectional shapes that are symmetrical with each other with respect to the terminal block, and the first insulation protection unit and the second insulation protection unit may have cross-sectional shapes that are symmetrical with each other with respect to the terminal block.

For example, the fuel cell may include a cell stack including a plurality of unit cells stacked in a first direction, end plates respectively disposed at the two opposite end portions of the cell stack, and current collectors disposed between the two opposite end portions of the cell stack and the end plates. The current collectors may collect power generated in the cell stack, and may be electrically connected to the one end portion of the bus bar. The flow path may extend in the first direction.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF ILLUSTRATIVE EMBODIMENTS

The present disclosure will now be described more fully hereinafter with reference to the accompanying drawings, in which various embodiments are shown. The examples, however, may be embodied in many different forms, and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a fuel cell vehicle according to an embodiment will be described with reference to the accompanying drawings. The fuel cell vehicle will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the embodiments are not limited thereto. That is, the x-axis, the y-axis, and the z-axis may intersect each other obliquely. For convenience of description, the x-axis direction will be referred to as a "first direction", the y-axis direction will be referred to as a "second direction", and the z-axis direction will be referred to as a "third direction".

Figure 1A:
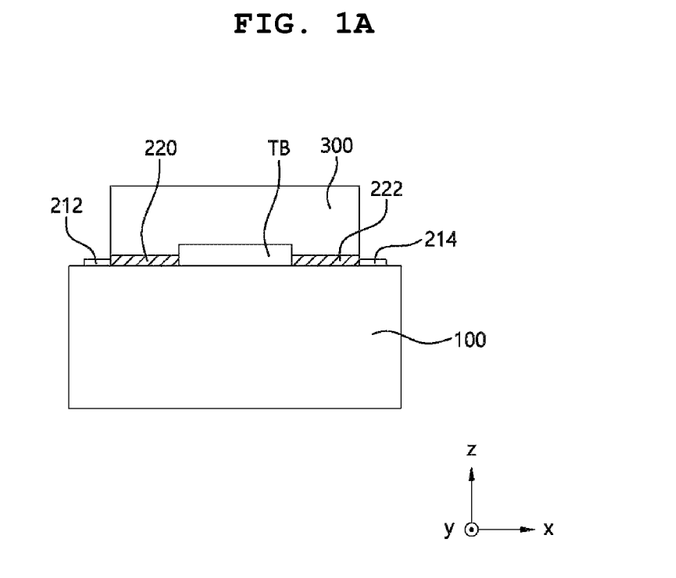
FIG. 1A is an assembled cross-sectional view of a fuel cell vehicle according to an embodiment.
Figure 1B:
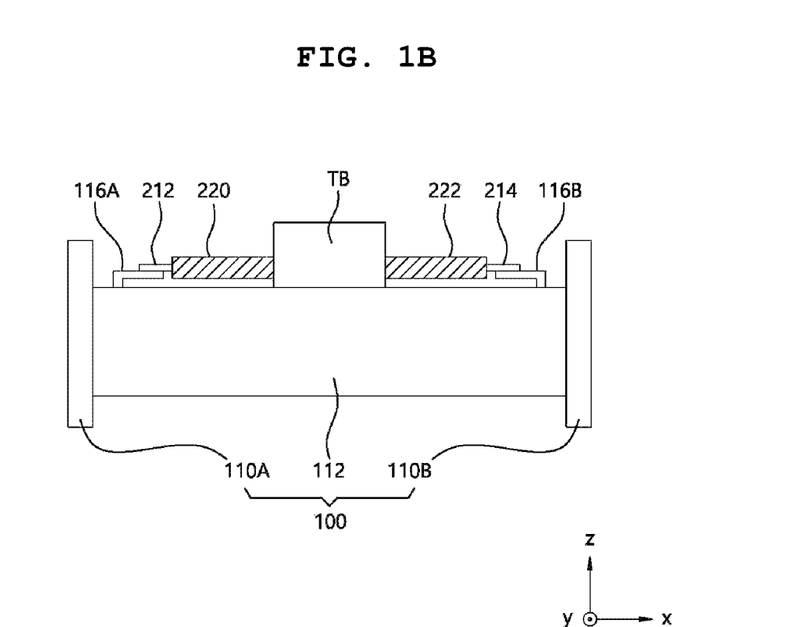
FIG. 1B is an assembled cross-sectional view of the fuel cell vehicle shown in FIG. 1A, from which a junction box is removed.
Figure 1C:
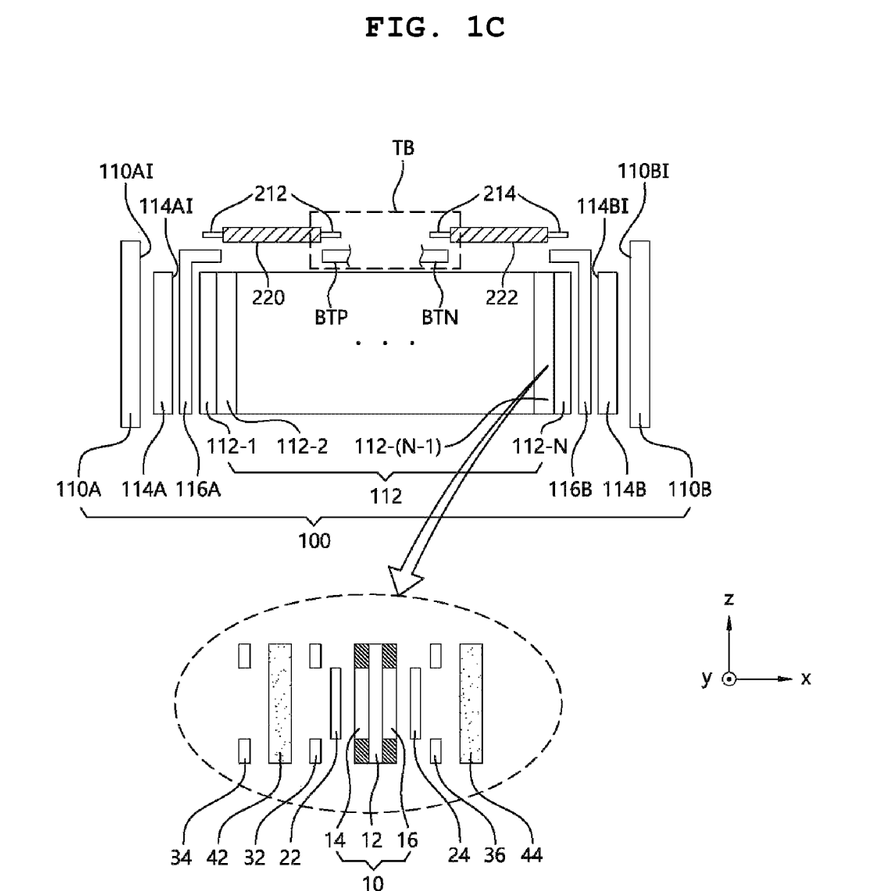
FIG. 1C is an exploded cross-sectional view of the fuel cell vehicle shown in FIG. 1B.
Figure 2:
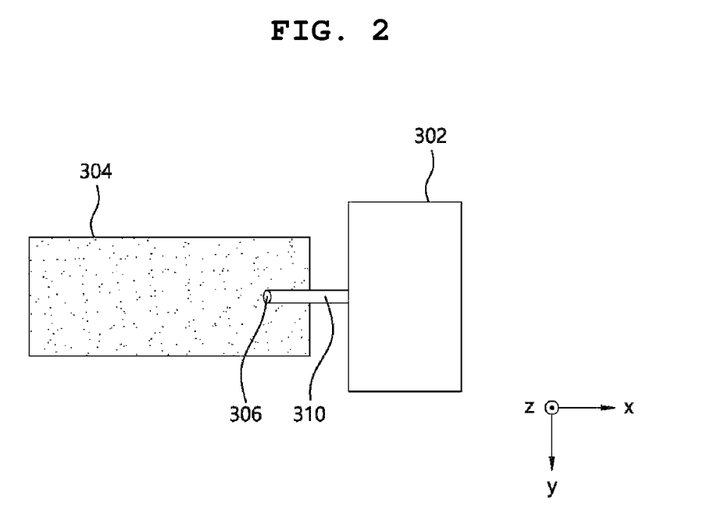
FIG. 2 is a plan view of a junction box according to an embodiment.
Figure 3A:
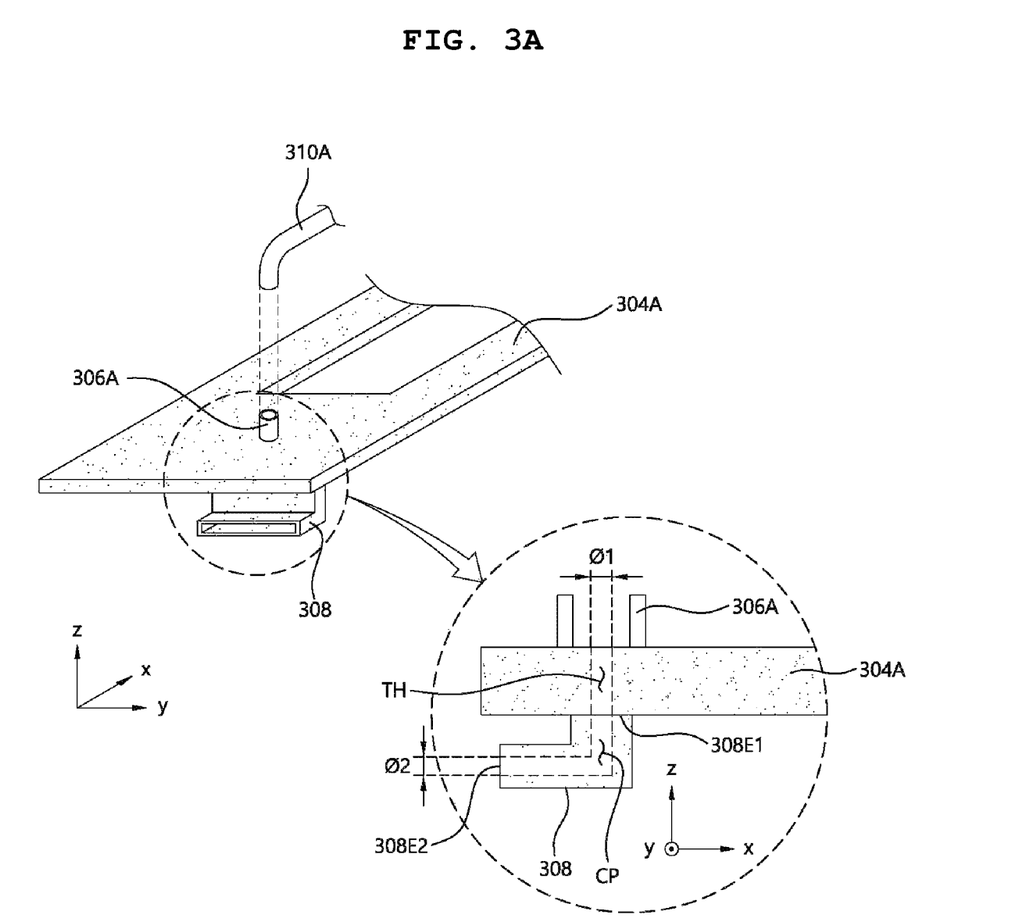
FIGS. 3A and 3B are perspective views of a cover of a terminal block according to an embodiment.
Figure 3B:
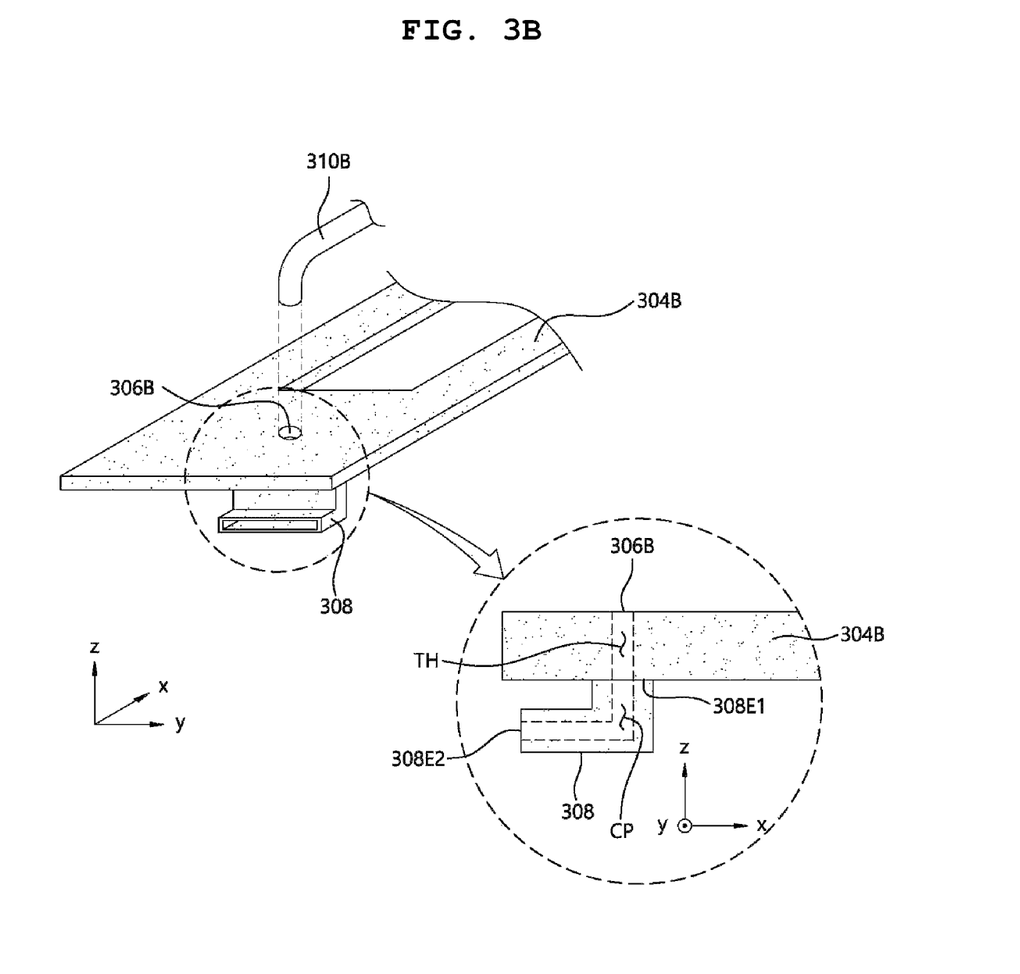
Figure 4A:
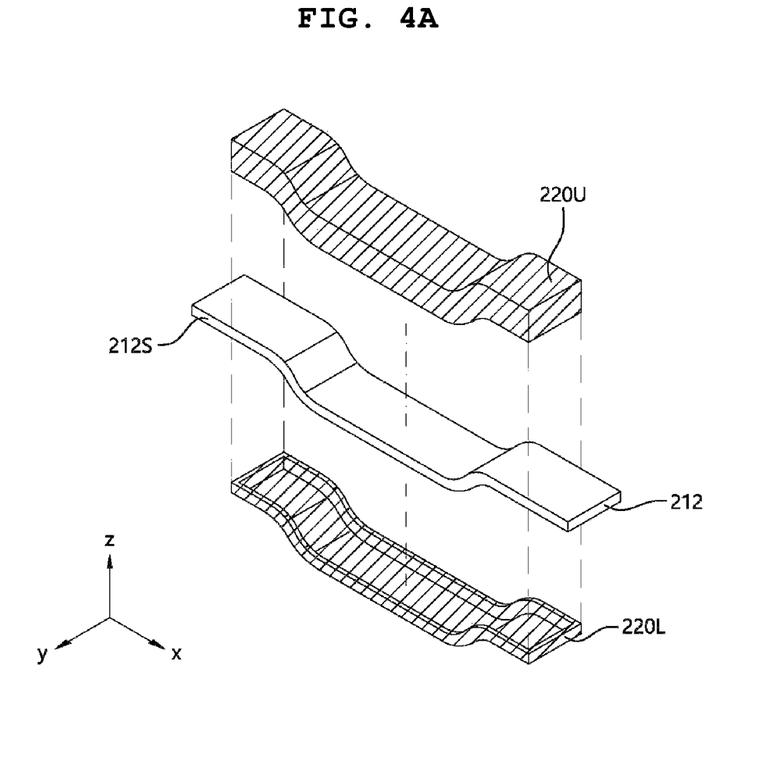
FIGS. 4A to 4C are, respectively, an exploded perspective view, an assembled cross-sectional view, and a plan view of a first bus bar and a first insulation protection unit according to an embodiment.
Figure 4B:
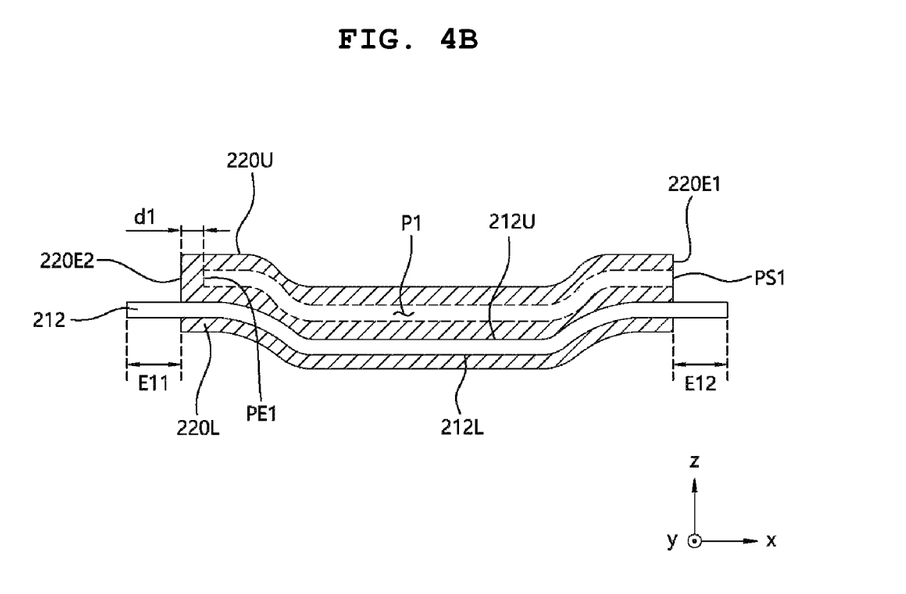
Figure 4C:
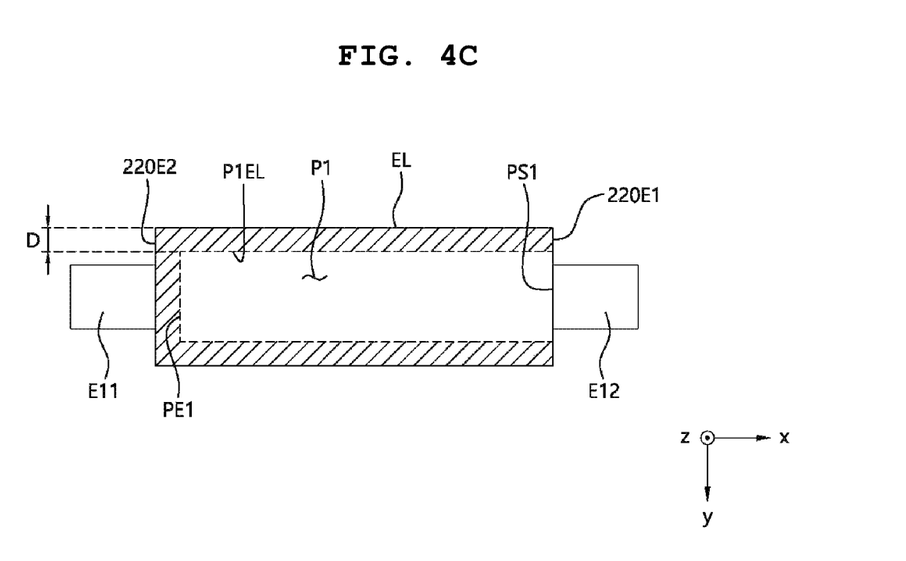
Figure 5:
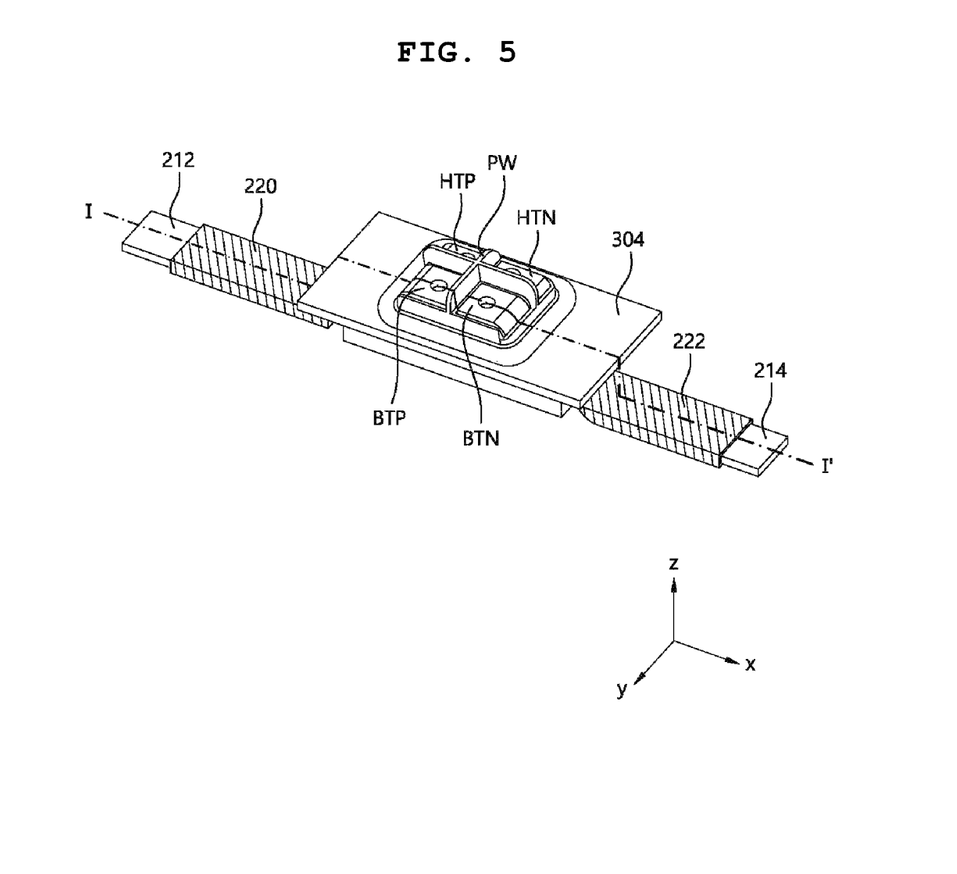
FIG. 5 is a perspective view of the terminal block, the bus bars, and the insulation protection units.
Figure 6:
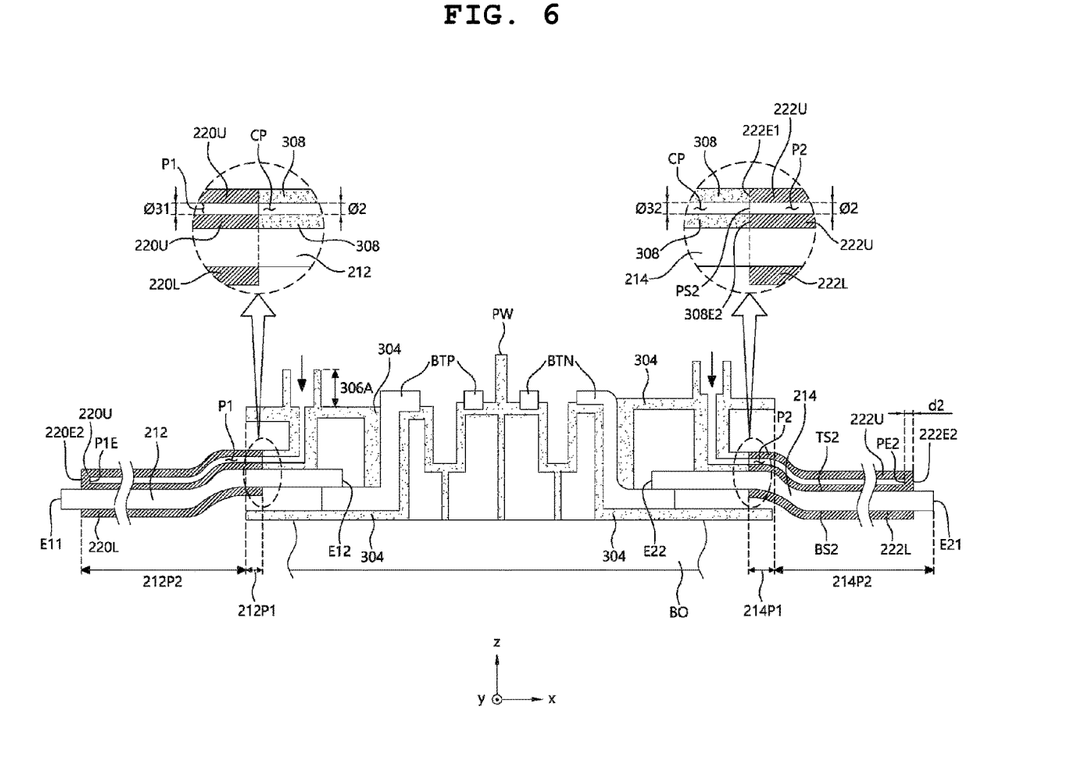
FIG. 6 is a cross-sectional view taken along line I-I' in FIG. 5.
Figure 7A:
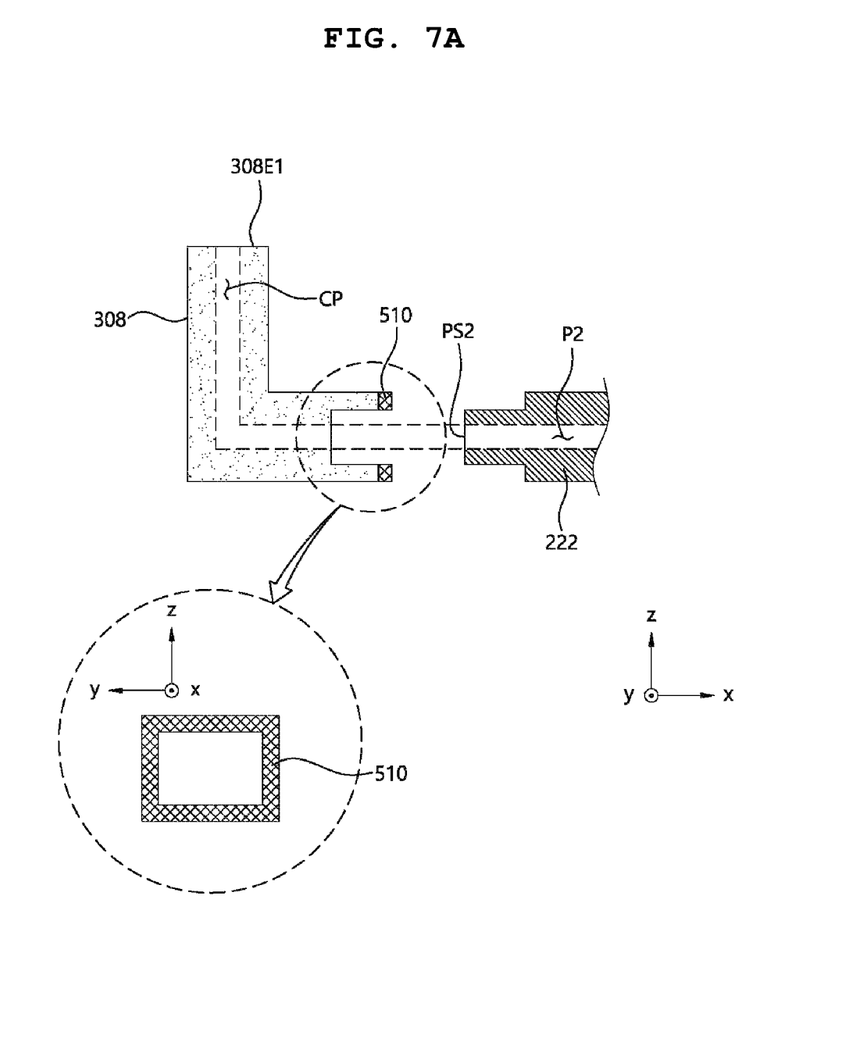
FIGS. 7A and 7B are exploded cross-sectional views of embodiments of an adapter and the insulation protection unit.
Figure 7B:
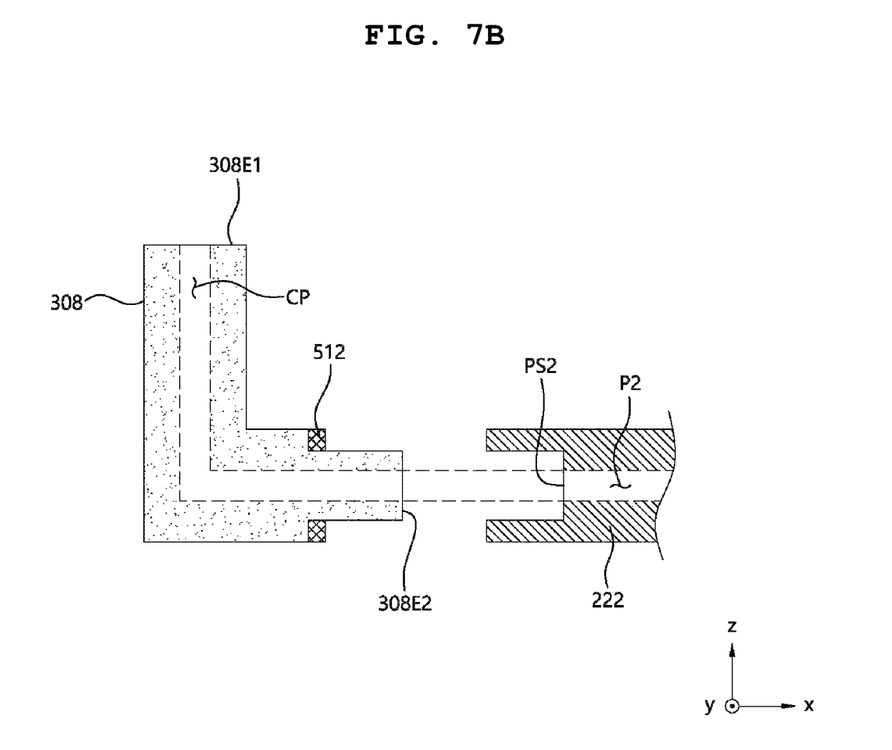

FIG. 1A is an assembled cross-sectional view of a fuel cell vehicle according to an embodiment, FIG. 1B is an assembled cross-sectional view of the fuel cell vehicle shown in FIG. 1A, from which a junction box (or a high-voltage junction box)300 is removed, and FIG. 1C is an exploded cross-sectional view of the fuel cell vehicle shown in FIG. 1B. FIG. 2 is a plan view of the junction box 300 according to an embodiment. FIGS. 3A and 3B are perspective views of a cover 304 of a terminal block TB according to an embodiment. FIGS. 4A to 4C are, respectively, an exploded perspective view, an assembled cross-sectional view, and a plan view of a first bus bar 212 and a first insulation protection unit 220 according to an embodiment. FIG. 5 is a perspective view of the terminal block TB, the bus bars 212 and 214, and the insulation protection units 220 and 222. FIG. 6 is a cross-sectional view taken along line I-I' in FIG. 5. FIGS. 7A and 7B are exploded cross-sectional views of embodiments of an adapter 308 and the insulation protection unit 222.

A fuel cell vehicle according to an embodiment may include a fuel cell 100, bus bars 212 and 214, insulation protection units 220 and 222, a terminal block TB, and a junction box 300.

Hereinafter, an example of the fuel cell 100 included in the fuel cell vehicle according to the embodiment will be described with reference to FIG. 1C. However, the fuel cell vehicle according to the embodiment may include a fuel cell that is configured differently from the fuel cell shown in FIG. 1C.

The fuel cell 100 may be, for example, a polymer electrolyte membrane fuel cell (or a proton exchange membrane fuel cell) (PEMFC), which has been studied most extensively as a power source for driving vehicles.

The fuel cell 100 may include first and second end plates (or pressing plates or compression plates) 110A and 110B, insulation plates 114A and 114B, current collectors 116A and 116B, and a cell stack 112.

The cell stack 112 may include a plurality of unit cells 112-1 to 112-N, which are stacked in the first direction. Here, "N" is a positive integer of 1 or greater, and may range from several tens to several hundreds. The embodiments are not limited to any specific value of "N".

Each unit cell 122-$n$ may generate 0.6 volts to 1.0 volt of electricity. Here, $1 \leq n \leq N$. Thus, "N" may be determined in accordance with the intensity of the power supplied from the fuel cell 100 to a load. Here, "load" may refer to a part of the fuel cell vehicle that requires power from the fuel cell.

The fuel cell vehicle according to the embodiment may be a vehicle that requires a great amount of power, such as, for example, a bus, a truck, a large sport utility vehicle (SUV), or a pickup truck (hereinafter referred to as a "commercial vehicle"). In the case of a vehicle that requires a great amount of driving power, a plurality of fuel cells may be provided.

Each unit cell 112-*n* may include a membrane electrode assembly (MEA) 10, gas diffusion layers (GDLs) 22 and 24, gaskets 32, 34, and 36, and separators (or bipolar plates)42 and 44.

The membrane electrode assembly 10 has a structure in which catalyst electrode layers, in which an electrochemical reaction occurs, are attached to both sides of an electrolyte membrane through which hydrogen ions move. Specifically, the membrane electrode assembly 10 may include a polymer electrolyte membrane (or a proton exchange membrane) 12, a fuel electrode (or a hydrogen electrode or an anode) 14, and an air electrode (or an oxygen electrode or a cathode) 16.

The polymer electrolyte membrane 12 is disposed between the fuel electrode 14 and the air electrode 16.

Hydrogen, which is the fuel in the fuel cell, may be supplied to the fuel electrode 14 through the first separator 42, and air containing oxygen as an oxidizer may be supplied to the air electrode 16 through the second separator 44.

The hydrogen supplied to the fuel electrode 14 is decomposed into hydrogen ions (protons) (H+) and electrons (e−) by the catalyst. The hydrogen ions alone may be selectively transferred to the air electrode 16 through the polymer electrolyte membrane 12, and at the same time, the electrons may be transferred to the air electrode 16 through the gas diffusion layers 22 and 24 and the first and second separators 42 and 44, which are conductors. In order to realize the above operation, a catalyst layer may be applied to each of the fuel electrode 14 and the air electrode 16. The movement of the electrons described above causes the electrons to flow through an external conductive wire, thus generating current. That is, the fuel cell generates electric power due to the electrochemical reaction between hydrogen, which is the fuel, and oxygen contained in the air.

In the air electrode 16, the hydrogen ions supplied through the polymer electrolyte membrane 12 and the electrons transferred through the first and second separators 42 and 44 meet the oxygen in the air supplied to the air electrode 16, thus causing a reaction that generates water. The water generated in the air electrode 16 may permeate the polymer electrolyte membrane 12, and may be transferred to the fuel electrode 14.

The first and second gas diffusion layers 22 and 24 serve to uniformly distribute hydrogen and oxygen, which are reactant gases, and to transfer the generated electrical energy. To this end, the first and second gas diffusion layers 22 and 24 may be disposed on respective sides of the membrane electrode assembly 10. The first gas diffusion layer 22 may serve to diffuse and uniformly distribute hydrogen supplied as a reactant gas through the first separator 42, and may be electrically conductive. The second gas diffusion layer 24 may serve to diffuse and uniformly distribute air supplied as a reactant gas through the second separator 44, and may be electrically conductive.

The gaskets 32, 34, and 36 may serve to maintain the airtightness and clamping pressure of the cell stack at an appropriate level with respect to the reactant gases and the coolant, to disperse the stress when the first and second separators 42 and 44 are stacked, and to independently seal the flow paths. As such, since airtightness and watertightness are maintained by the gaskets 32, 34, and 36, the flatness of the surfaces that are adjacent to the cell stack 112, which generates electric power, may be secured, and thus surface pressure may be uniformly distributed over the reaction surfaces of the cell stack 112.

The first and second separators 42 and 44 may serve to move the reactant gases and the cooling medium and to separate each of the unit cells from the other unit cells. In addition, the first and second separators 42 and 44 may serve to structurally support the membrane electrode assembly 10 and the gas diffusion layers 22 and 24 and to collect the generated current and transfer the collected current to the current collectors 116A and 116B.

The first and second separators 42 and 44 may be spaced apart from each other in the first direction, and may be respectively disposed outside the first and second gas diffusion layers 22 and 24. That is, the first separator 42 may be disposed on the left side of the first gas diffusion layer 22, and the second separator 44 may be disposed on the right side of the second gas diffusion layer 24.

The first separator 42 serves to supply hydrogen as a reactant gas to the fuel electrode 14 through the first gas diffusion layer 22. The second separator 44 serves to supply air as a reactant gas to the air electrode 16 through the second gas diffusion layer 24. In addition, each of the first and second separators 42 and 44 may form a channel through which the cooling medium (e.g. coolant) may flow.

The first and second end plates 110A and 110B may be disposed at respective side ends of the cell stack 112, and may support and fix the plurality of unit cells. That is, the first end plate 110A may be disposed at one side end of the cell stack 112, and the second end plate 110B may be disposed at the opposite side end of the cell stack 112.

The insulation plates 114A and 114B may be disposed between the cell stack 112 and the inner surfaces 110AI and 110BI of the first and second end plates 110A and 110B that face the cell stack 112.

The current collectors 116A and 116B may be disposed between the cell stack 112 and the inner surfaces 114AI and 114BI of the first and second insulation plates 114A and 114B that face the cell stack 112. In some cases, the insulation plates 114A and 114B may be omitted. In this case, the current collectors 116A and 116B may be disposed between the cell stack 112 and the inner surfaces 110AI and 110BI of the first and second end plates 110A and 110B that face the cell stack 112.

The current collectors 116A and 116B serve to collect the electrical energy generated by the flow of electrons in the cell stack 112 and to supply the electrical energy to a load of the fuel cell vehicle. That is, the current collectors 116A and 116B may collect the electric power generated in the cell stack 112. To this end, as shown in FIGS. 1B and 1C, one end portion of each of the current collectors 116A and 116B may be bent in the first direction so as to be located above the cell stack 112, and may thus be electrically connected to a corresponding one of end portions E11 and E21 of the bus bars 212 and 214, which will be described later.

Although not illustrated, the fuel cell 100 may further include an enclosure.

Referring again to FIG. 1B, the bus bars 212 and 214 serve to electrically connect the current collectors 116A and 116B of the fuel cell 100 to the terminal block TB, and are conductors that are electrically conductive. That is, the bus bars 212 and 214 serve to transfer the electrical energy generated in the fuel cell wo to the terminal block TB.

To this end, the bus bar 212 includes an end portion E11 electrically connected to the fuel cell 100 and an opposite end portion E12 electrically connected to the terminal block TB, and the bus bar 214 includes an end portion E21 electrically connected to the fuel cell 100 and an opposite end portion E22 electrically connected to the terminal block TB.

The bus bars may include first and second bus bars 212 and 214. The first bus bar 212 is disposed between one end portion of the fuel cell wo and the terminal block TB to electrically connect the first current collector 116A to the terminal block TB. The second bus bar 214 is disposed between the opposite end portion of the fuel cell 100 and the terminal block TB to electrically connect the second current collector 116B to the terminal block TB.

The first bus bar 212 and the second bus bar 214 may have cross-sectional shapes that are symmetrical with each other in the first direction with respect to the terminal block TB. In this case, the description of the first bus bar 212 may apply to the second bus bar 214, and the description of the second bus bar 214 may apply to the first bus bar 212. Therefore, with regard to any aspect of any one of the first and second bus bars 212 and 214 that is not described in detail, reference may be made to the description of the other one of the first and second bus bars 212 and 214.

Referring to FIG. 6, the first bus bar 212 may include a first portion 212P1 and a second portion 212P2, and the second bus bar 214 may include a first portion 214P1 and a second portion 214P2.

The first portions 212P1 and 214P1 may be portions that vertically overlap the cover 304 of the terminal block TB, which will be described later. Alternatively, the first portions 212P1 and 214P1 may be portions that are adjacent to the opposite end portions E12 and E22 of the bus bars 212 and 214 that are connected to the terminal block TB.

The second portions 212P2 and 214P2 may be portions that extend from the first portions 212P1 and 214P1 toward the end portions of the fuel cell 100, i.e. the current collectors 116A and 116B.

The insulation protection units 220 and 222 are disposed so as to surround at least a portion of the bus bars 212 and 214, and serve to electrically insulate the bus bars 212 and 214 from the fuel cell 100. As shown in FIG. 1B, the bus bars 212 and 214, which are electrically conductive, are disposed above the cell stack 112 of the fuel cell 100. Accordingly, when the insulation protection units 220 and 222 are not present, the bus bars 212 and 214 may not be electrically insulated from the cell stack 112, and thus the cell stack 112 may not operate normally. In order to prevent this, the insulation protection units 220 and 222 may be disposed so as to surround at least a portion of the bus bars 212 and 214 to electrically insulate the bus bars 212 and 214 from the cell stack 112. For example, the insulation protection units 220 and 222 may be made of an electrically insulative material.

In addition, according to the embodiment, each of the insulation protection units 220 and 222 has formed therein a flow path through which the coolant supplied from the cover 304 of the terminal block TB flows.

The insulation protection units may include first and second insulation protection units 220 and 222. The first insulation protection unit 220 surrounds at least a portion of the first bus bar 212, and has formed therein a flow path P1 (hereinafter referred to as a "first flow path") through which the coolant flows. The second insulation protection unit 222 surrounds at least a portion of the second bus bar 214, and has formed therein a flow path P2 (hereinafter referred to as a "second flow path") through which the coolant flows.

Also, the first insulation protection unit 220 and the second insulation protection unit 222 may have cross-sectional shapes that are symmetrical with each other in the first direction with respect to the terminal block TB. In this case, the description of the first insulation protection unit 220 may apply to the second insulation protection unit 222, and the description of the second insulation protection unit 222 may apply to the first insulation protection unit 220. Therefore, with regard to any aspect of any one of the first and second insulation protection units 220 and 222 that is not described in detail, reference may be made to the description of the other one of the first and second insulation protection units 220 and 222.

The insulation protection units 220 and 222 may be disposed so as to expose the end portions E11 and E21 and the opposite end portions E12 and E22 of the bus bars 212 and 214 and to surround at least a portion of the upper portions, the lower portions, or the side portions of the bus bars 212 and 214.

Referring to FIGS. 4A to 4C, the first insulation protection unit 220 may include first and second plates 220L and 220U. The first plate 220L may be disposed so as to expose the end portion E11 and the opposite end portion E12 of the first bus bar 212 and to surround at least a portion of each of the lower portion 212L and the side portion 212S of the first bus bar 212. The second plate 220U may be coupled to the first plate 220L so as to expose the end portion E11 and the opposite end portion E12 of the first bus bar 212 and to cover at least a portion of the upper portion 212U of the first bus bar 212. The second plate 220U has formed therein the first flow path P1. The description of the configuration of the first insulation protection unit 220 may also apply to the configuration of the second insulation protection unit 222, which is not illustrated in the drawings. That is, the second insulation protection unit 222 may include first and second plates 222U and 222L, like the first insulation protection unit 220 shown in FIGS. 4A to 4C.

According to an embodiment, the first flow path P1 in the second plate 220U may cover only the upper side of the first portion 212P1 of the first bus bar 212.

When the bus bars 212 and 214 transfer power from the fuel cell 100 to the terminal block TB, the first portions 212P1 and 214P1 of the bus bars 212 and 214 generate a larger amount of heat than the second portions 212P2 and 214P2. The first flow path P1 may cover the first portion 212P1, and the second flow path P2 may cover the first portion 214P1.

According to another embodiment, as shown in FIG. 6, the first flow path P1 in the second plate 220U may cover not only the upper side of the first portion 212P1 of the first bus bar 212 but also the upper side of at least a portion of the second portion 212P2.

Also, referring to FIG. 4C, the edge P1EL of the first flow path P1 formed in the second plate 220U may be located so as to be spaced a predetermined distance D apart from the edge EL of the second plate 220U in the second direction.

The junction box 300 serves to distribute the power generated in the cell stack 112 of the fuel cell 100. That is, the junction box 300 serves to control the output of the electrical energy generated in the fuel cell 100 and to transfer the electrical energy. To this end, the junction box 300 may be electrically connected to the fuel cell 100 via the terminal block TB, and may include fuses and relays to control components of peripheral auxiliary devices (balance-of-plant (BOP)) assisting in the operation of the fuel cell 100. For example, as shown in FIG. 1A, the junction box 300 may be disposed above the fuel cell 100, but the fuel cell vehicle according to the embodiment is not limited to any specific position of the junction box 300. In this case, the terminal block TB and the insulation protection units 220 and 222 may be disposed below the junction box 300, and only the end portions E11 and E21 of the bus bars 212 and 214 may be exposed to the outside of the junction box 300, but the embodiments are not limited thereto.

The terminal block TB serves to transfer the electrical energy, received from the current collectors 116A and 116B through the bus bars 212 and 214, to the junction box 300. To this end, the terminal block TB may be electrically connected to the opposite end portions E12 and E22 of the bus bars 212 and 214.

The configuration of the terminal block TB will now be described briefly with reference to FIGS. 5 and 6. However, the fuel cell vehicle according to the embodiment is not limited as to the specific configuration of the terminal block TB to be described below.

The terminal block TB may include a body BO, a partition wall PW, a positive bus terminal BTP, a negative bus terminal BTN, a positive heater terminal HTP, and a negative heater terminal HTN.

Each of the body BO and the partition wall PW may be made of an insulative material. At least a portion of each of the positive bus terminal BTP, the negative bus terminal BTN, the positive heater terminal HTP, and the negative heater terminal HTN may be embedded in the body BO, or may be disposed on the body BO, as illustrated in FIG. 6.

The partition wall PW is disposed on the body BO in order to electrically isolate the positive bus terminal BTP, the negative bus terminal BTN, the positive heater terminal HTP, and the negative heater terminal HTN from each other.

One of the first and second bus bars 212 and 214 is a positive bus bar, and the other one thereof is a negative bus bar. For convenience of description, it is assumed that a coolant manifold is disposed in the first end plate 110A and that a hydrogen manifold and an air manifold are disposed in the second end plate 110B. Hereinafter, the first bus bar 212 will be referred to as a positive bus bar, and the second bus bar 214 will be referred to as a negative bus bar. In this case, the length of the first positive bus bar 212 in the first direction may be shorter than the length of the second negative bus bar 214 in the first direction, but the embodiments are not limited thereto.

The positive bus terminal BTP may be connected to the first positive bus bar BP (212), the negative bus terminal BTN may be connected to the second negative bus bar BN (214), the positive heater terminal HTP may be connected to a positive wire WP (not shown), and the negative heater terminal HTN may be connected to a negative wire WN (not shown). To this end, conductive wires may be disposed in the terminal block TB.

Although not illustrated, these components (BTP and BP), (BTN and BN), (HTP and WP), and (HTN and WN) may be connected to each other by means of electrically conductive bolts or the like, but the embodiments are not limited to any specific connection structure between the components (BTP and BP), (BTN and BN), (HTP and WP), and (HTN and WN). Each of the terminals BTP, BTN, HTP, and HTN of the terminal block TB may be connected to the fuel cell 100 via the bus bars BP and BN and the wires WP and WN.

As shown in FIG. 5, the positive bus terminal BTP and the negative bus terminal BTN may be arranged so as to be aligned with each other in the first direction, and the positive heater terminal HTP and the negative heater terminal HTN may be arranged so as to be aligned with each other in a direction parallel to the first direction. Alternatively, unlike what is illustrated in FIG. 5, one of the positive bus terminal BTP and the negative bus terminal BTN and one of the positive heater terminal HTP and the negative heater terminal HTN may be arranged so as to be aligned with each other in the first direction, and the other one of the positive bus terminal BTP and the negative bus terminal BTN and the other one of the positive heater terminal HTP and the negative heater terminal HTN may be arranged so as to be aligned with each other in a direction parallel to the first direction.

Although not illustrated, heaters H1 and H2 may be disposed at respective ends of the cell stack 112. The first heater H1 may be connected to one of the positive wire WP and the negative wire WN, and the second heater H2 may be connected to the other one of the positive wire WP and the negative wire WN.

The heaters and the current collectors 116A and 116B of the fuel cell 100 may be connected to the junction box 300 via the terminal block TB. To this end, the first positive bus bar BP (212) and the second negative bus bar BN (214) may electrically connect the current collectors 116A and 116B to the terminal block TB, and the positive wire WP and the negative wire WN may electrically connect the heaters H1 and H2 to the terminal block TB.

Although not illustrated, the positive bus terminal BTP, the negative bus terminal BTN, the positive heater terminal HTP, and the negative heater terminal HTN of the terminal block TB may be connected to the fuses and the relays of the junction box 300. Since the electrical connection between the terminal block TB and the junction box 300 is well-known technology, a detailed description thereof will be omitted. An example of the connection between each of the terminals BTP, BTN, HTP, and HTN of the terminal block and the fuses and the relays of the junction box 300 is disclosed in Korean Patent Application No. 10-2020-0118363, which was filed by the present applicant.

In addition, the terminal block TB may further include a cover 304. The cover 304 serves to support the weight of the bus bars 212 and 214, to electrically insulate the same, and to make the same watertight.

The cover 304 of the terminal block TB may include a coolant connection portion 306, a through-hole TH, and an adapter 308.

The coolant connection portion 306 is a portion that is connected to a tube 310, which will be described later, and functions as an inlet through which the coolant flows into the cover 304 of the terminal block TB.

According to an embodiment, as illustrated in FIG. 3A, the coolant connection portion 306A may have the shape of a nipple that protrudes toward a tube 310A to be coupled to the tube 310A.

According to another embodiment, as illustrated in FIG. 3B, the coolant connection portion 306B may have the shape of an opening that is coupled to a tube 310B. Here, the opening may have a circular planar shape, but the embodiments are not limited to any specific planar shape of the opening.

In addition, referring to FIGS. 3A and 3B, the through-hole TH may be connected to the coolant connection portion 306 (306A or 306B), and may penetrate the cover 304 (304A or 304B) in the third direction.

The adapter 308 serves to connect the through-hole TH to the flow paths P1 and P2 in the insulation protection units 220 and 222. To this end, as shown in FIGS. 3A and 3B, the adapter 308 may include an end portion 308E1, which is connected to the through-hole TH, and an opposite end portion 308E2, which is connected to the insulation protection units 220 and 222. The adapter 308 may have a cross-sectional shape that extends from the end portion 308E1 in the third direction and is then bent and extends in the first direction. The adapter 308 may include a fluid passage CP to provide the coolant, introduced through the coolant connection portion 306 and the through-hole TH, to the flow paths P1 and P2 in the insulation protection units 220 and 222.

The coolant connection portion 306 (306A or 306B) and the adapter 308 may be formed integrally with the cover 304 (304A or 304B).

According to the embodiment, one of the coolant connection portion 306 and the adapter 308 may be formed at the upper side of the cover 304, and the other one thereof may be formed at the lower side of the cover 304. For example, as shown in FIGS. 3A and 3B, the coolant connection portion 306A or 306B may be formed at the upper side of the cover 304A or 304B, and the adapter 308 may be formed at the lower side of the cover 304A or 304B.

The first diameter Φ1 of the through-hole TH, the second diameter Φ2 of the fluid passage CP in the adapter 308, and the third diameter Φ31 and Φ32 of the flow paths P1 and P2 in the insulation protection units 220 and 222 may be equal to each other, but the embodiments are not limited thereto.

The through-hole TH may have a first diameter Φ1 that is uniform from the inlet to the outlet thereof in the third direction, the fluid passage CP in the adapter 308 may have a second diameter Φ2 that is uniform from a starting portion 308E1 to an ending portion 308E2 thereof, and the flow paths P1 and P2 in the insulation protection units 220 and 222 may have a third diameter Φ31 and Φ32 that is uniform from starting points PS1 and PS2 to ending points PE1 and PE2 thereof. However, the embodiments are not limited thereto.

The insulation protection units 220 and 222 may include end portions, which are located at the starting points of the flow paths P1 and P2 and which function as inlets that are coupled to the opposite end portion 308E2 of the adapter 308 to receive the coolant introduced thereinto. In addition, the insulation protection units 220 and 222 may include opposite end portions, which are located opposite the end portions functioning as the inlets. In this case, the ending points of the flow paths P1 and P2 may be spaced a predetermined distance apart from the opposite end portions of the insulation protection units 220 and 222, and the flow paths P1 and P2 may have shapes that are blocked at the ending points thereof.

For example, referring to FIGS. 4B and 6, the first insulation protection unit 220 may include an end portion 220E1, which is located at the starting point PS1 of the first flow path P1 and which functions as an inlet that is coupled to the opposite end portion 308E2 of the adapter 308 to receive the coolant introduced thereinto, and an opposite end portion 220E2, which is located opposite the end portion 220E1. In this case, the ending point PE1 of the first flow path P1 may be spaced a predetermined distance d1 apart from the opposite end portion 220E2 of the first insulation protection unit 220, and the first flow path P1 may have a shape that is blocked at the ending point PE1 thereof.

For example, referring to FIG. 6, the second insulation protection unit 222 may include an end portion 222E1, which is located at the starting point PS2 of the second flow path P2 and which functions as an inlet that is coupled to the opposite end portion 308E2 of the adapter 308 to receive the coolant introduced thereinto, and an opposite end portion 222E2, which is located opposite the end portion 222E1. In this case, the ending point PE2 of the second flow path P2 may be spaced a predetermined distance d2 apart from the opposite end portion 222E2 of the second insulation protection unit 222, and the second flow path P2 may have a shape that is closed at the ending point PE2 thereof.

In addition, one of the end portion 220E1 or 222E1 of the insulation protection unit 220 or 222 and the opposite end portion 308E2 of the adapter 308 may have a protrusion, and the other one thereof may have a recessed portion into which the protrusion is fitted.

For example, as shown in FIG. 7A, the end portion 222E1 of the second insulation protection unit 222 may have a protrusion, and the opposite end portion 308E2 of the adapter 308 may have a recessed portion into which the protrusion is fitted. Alternatively, as shown in FIG. 7B, the opposite end portion 308E2 of the adapter 308 may have a protrusion, and the end portion 222E1 of the second insulation protection unit 222 may have a recessed portion into which the protrusion is fitted.

As described above, when the adapter 308 and the insulation protection units 220 and 222 are coupled to each other using the protrusion and the recessed portion, the coolant may leak through the coupled portion between the protrusion and the recessed portion. In order to prevent this, the fuel cell vehicle may further include a sealing gasket 510 for sealing the coupled portion between the protrusion and the recessed portion, as shown in FIGS. 7A and 7B.

According to another embodiment, the end portions 220E1 and 222E1 of the insulation protection units 220 and 222 and the opposite end portion 308E2 of the adapter 308 may be integrated. In this case, the sealing gasket 510 shown in FIGS. 7A and 7B is not required.

As illustrated in FIG. 2, the junction box 300 may include a chamber 302 and a tube 310.

The chamber 302 serves to store therein the coolant necessary to cool the bus bars 212 and 214.

The tube 310 may form a path through which the coolant flows from the chamber 302 to the cover 304 (304A or 304B) of the terminal block TB, and may be implemented as a flexible vent hose. In this case, the end portion of the tube 310 (310A) may be connected to the cover 304 (304A or 304B) of the terminal block TB using a clamp so as to form a seal in order to prevent leakage of the coolant.

The flow of the coolant in the fuel cell vehicle configured as described above will be described below.

First, the coolant stored in the chamber 302 shown in FIG. 2 is supplied to the coolant connection portion 306 (306A or 306B) formed at the cover 304 (304A or 304B) of the terminal block TB through the tube 310 (310A or 310B) in the direction of the arrow shown in FIG. 6. Thereafter, the coolant introduced through the coolant connection portion 306 (306A or 306B) is supplied to the flow paths P1 and P2 in the insulation protection units 220 and 222 through the through-hole TH and the fluid passage CP in the adapter 310. Accordingly, the coolant flows from the starting points PS1 and PS2 to the ending points PE1 and PE2 of the flow paths P1 and P2, which extend from the insulation protection units 220 and 222 in the first direction, thereby cooling the bus bars 212 and 214.

The bus bars 212 and 214 are cooled by controlling the flow rate of the coolant according to the operation region and the output of the junction box 300, whereby the temperature of the bus bars 212 and 214 may be maintained constant.

For example, when the bus bars 212 and 214 are not cooled, energy transfer loss at the bus bars 212 and 214 may increase due to heat generated in the bus bars 212 and 214. The reason for this is that the energy transferred through the bus bars 212 and 214 is lost as heat. In consideration of this, a method of increasing the cross-sectional areas of the bus bars 212 and 214 may be proposed. However, the increase in the cross-sectional areas of the bus bars 212 and 214 may increase the weight, size, and manufacturing cost of the bus bars 212 and 214, and may be disadvantageous from the aspect of packaging. In particular, the first portions 212P1 and 214P1 of the bus bars 212 and 214, which are in contact with the terminal block TB, generate the largest amount of heat, and thus a fire may occur at the first portions 212P1 and 214P1.

In contrast, according to the embodiment, the coolant is supplied through the flow paths P1 and P2, which are formed along the route along which the bus bars 212 and 214 are formed, and the temperature of the coolant is adjusted to cool the bus bars 212 and 214, thereby making it possible to reduce energy transfer loss at the bus bars 212 and 214. Accordingly, compared to the configuration in which the bus bars 212 and 214 are not cooled, the cross-sectional areas of the bus bars 212 and 214 may be reduced, which makes it possible to reduce the size, weight, and manufacturing cost of the bus bars 212 and 214 and which may be advantageous from the aspect of packaging due to the resultant increase in space for packaging. As a result, it is possible to manufacture a fuel cell vehicle having a compact size while meeting requirements for high output.

In addition, since the first portions 212P1 and 214P1 of the bus bars 212 and 214, which are in contact with the terminal block TB, are cooled by the coolant, it is possible to prevent the occurrence of a fire at the first portions 212P1 and 214P1 and thus to improve the electrical stability of the fuel cell vehicle.

As is apparent from the above description, according to the fuel cell vehicle of the embodiment, it is possible to reduce the size, weight, and manufacturing cost of the bus bar, and thus the bus bar according to the embodiment may be advantageous from the aspect of packaging by increasing the amount of space for packaging. Further, it is possible to manufacture a fuel cell vehicle that has a compact size and meets requirements for high output. Furthermore, since the first portion of the bus bar, which is in contact with the terminal block, is cooled by coolant, it is possible to prevent the occurrence of a fire at the first portion and thus to improve the electrical stability of the fuel cell vehicle.

However, the effects achievable through the disclosure are not limited to the above-mentioned effects, and other effects not mentioned herein will be clearly understood by those skilled in the art from the above description.

The above-described various embodiments may be combined with each other without departing from the objects of the present disclosure unless they are incompatible with each other.

In addition, for any element that is not described in detail in any of the various embodiments, reference may be made to the description of an element having the same reference numeral in another embodiment.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A system comprising:
   a fuel cell;
   a bus bar having one end portion configured to be electrically connected to the fuel cell, the bus bar being electrically conductive;
   a terminal block configured to be electrically connected to an opposite end portion of the bus bar;
   a junction box including a chamber storing a coolant and a tube forming a path to allow the coolant to flow from the chamber to a cover of the terminal block; and
   an insulation protection unit disposed to surround at least a portion of the bus bar to electrically insulate the bus bar from the fuel cell, the insulation protection unit having a flow path to allow the coolant supplied from the cover to flow therethrough.

2. The system according to claim 1, wherein the insulation protection unit exposes the one end portion and the opposite end portion of the bus bar and surrounds at least a portion of an upper portion, a lower portion, or a side portion of the bus bar.

3. The system according to claim 2, wherein the cover of the terminal block includes:
   a coolant connection portion connected to the tube to receive the coolant;
   a through-hole connected to the coolant connection portion, the through-hole penetrating the cover; and
   an adapter connecting the through-hole to the flow path in the insulation protection unit.

4. The system according to claim 3, wherein the coolant connection portion has a shape of a nipple that protrudes toward the tube to be coupled to the tube.

5. The system according to claim 3, wherein the coolant connection portion has a shape of an opening that is coupled to the tube.

6. The system according to claim 3, wherein the insulation protection unit includes one end portion disposed at a starting point of the flow path, the one end portion being an inlet coupled to an end portion of the adapter to receive the coolant.

7. The system according to claim 6,
   wherein the insulation protection unit includes an opposite end portion located opposite the one end portion,
   wherein an ending point of the flow path is spaced a predetermined distance apart from the opposite end portion of the insulation protection unit, and
   wherein the flow path is blocked at the ending point.

8. The system according to claim 6,
   wherein one of the one end portion of the insulation protection unit and the end portion of the adapter has a protrusion, and
   wherein a remaining one of the one end portion of the insulation protection unit and the end portion of the adapter has a recessed portion formed therein to allow the protrusion to be fitted thereinto.

9. The system according to claim 8, further comprising a sealing gasket sealing a coupled portion between the protrusion and the recessed portion.

10. The system according to claim 6, wherein the one end portion of the insulation protection unit and the end portion of the adapter are integrated.

11. The system according to claim 3, wherein the insulation protection unit comprises:
   a first plate disposed to expose the one end portion and the opposite end portion of the bus bar and to surround a portion of each of the lower portion and the side portion of the bus bar, and
   a second plate coupled to the first plate to cover at least a portion of the upper portion of the bus bar, the second plate comprising the flow path formed therein.

12. The system according to claim 11, wherein the bus bar comprises:
   a first portion vertically overlapping the cover, and
   a second portion extending from the first portion toward an end portion of the fuel cell.

13. The system according to claim 12, wherein the flow path in the second plate covers an upper portion of the first portion.

14. The system according to claim 13, wherein the flow path in the second plate covers an upper portion of at least a portion of the second portion.

15. The system according to claim 1,
   wherein the bus bar comprises:
      a first bus bar disposed between one of two opposite end portions of the fuel cell and the terminal block, and
      a second bus bar disposed between a remaining one of the two opposite end portions of the fuel cell and the terminal block, and
   wherein the insulation protection unit comprises:
      a first insulation protection unit surrounding at least a portion of the first bus bar, the first insulation protection unit including a first flow path to allow the coolant to flow therethrough, and
      a second insulation protection unit surrounding at least a portion of the second bus bar, the second insulation protection unit including a second flow path to allow the coolant to flow therethrough.

16. The system according to claim 15,
   wherein the first bus bar and the second bus bar have cross-sectional shapes that are symmetrical with each other with respect to the terminal block, and
   wherein the first insulation protection unit and the second insulation protection unit have cross-sectional shapes that are symmetrical with each other with respect to the terminal block.

17. The system according to claim 1, wherein the fuel cell comprises:
   a cell stack including a plurality of unit cells stacked in a first direction,
   end plates respectively disposed at two opposite end portions of the cell stack, and
   current collectors disposed between the two opposite end portions of the cell stack and the end plates, the current collectors being configured to collect power generated in the cell stack and the current collectors being electrically connected to the one end portion of the bus bar, and
   wherein the flow path extends in the first direction.

* * * * *